(12) United States Patent
Kang et al.

(10) Patent No.: US 9,701,861 B2
(45) Date of Patent: Jul. 11, 2017

(54) PLASTIC FILM

(71) Applicant: LG CHEM, LTD., Seoul (KR)

(72) Inventors: Joon Koo Kang, Daejeon (KR); Yeong Rae Chang, Daejeon (KR); Heon Kim, Daejeon (KR); Han Na Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/777,379

(22) PCT Filed: Mar. 13, 2014

(86) PCT No.: PCT/KR2014/002123
§ 371 (c)(1),
(2) Date: Sep. 15, 2015

(87) PCT Pub. No.: WO2014/142579
PCT Pub. Date: Sep. 18, 2014

(65) Prior Publication Data
US 2016/0032136 A1  Feb. 4, 2016

(30) Foreign Application Priority Data

Mar. 15, 2013  (KR) .................. 10-2013-0028141
Mar. 12, 2014  (KR) .................. 10-2014-0029033

(51) Int. Cl.
*C09D 133/08* (2006.01)
*C08J 7/04* (2006.01)
*C09D 133/04* (2006.01)
*C09D 135/02* (2006.01)
*C09D 175/04* (2006.01)
*G02B 1/10* (2015.01)
*C08K 3/22* (2006.01)
*C08K 3/36* (2006.01)

(52) U.S. Cl.
CPC .............. *C09D 133/08* (2013.01); *C08J 7/04* (2013.01); *C09D 133/04* (2013.01); *C09D 135/02* (2013.01); *C09D 175/04* (2013.01); *G02B 1/10* (2013.01); *C08K 3/22* (2013.01); *C08K 3/36* (2013.01); *C08K 2003/2227* (2013.01); *C08K 2003/2237* (2013.01); *C08K 2003/2296* (2013.01)

(58) Field of Classification Search
CPC ........ C08J 7/04; C09D 133/04; C09D 133/08; C09D 135/02; C09D 175/04; C08K 2003/2227; C08K 2003/2237; C08K 2003/2296; C08K 3/22; C08K 3/36; G02B 1/10; Y10T 428/31551
USPC ........................................... 428/423.1; 525/50
See application file for complete search history.

(56) References Cited

U.S. PATENT DOCUMENTS

| | | | |
|---|---|---|---|
| 7,045,558 B2 | 5/2006 | Chisholm et al. | |
| 2005/0196618 A1* | 9/2005 | Knox ................ | C08G 18/0823 428/414 |
| 2006/0269731 A1 | 11/2006 | Yoshikawa et al. | |
| 2010/0265580 A1* | 10/2010 | Yun ......................... | C08F 2/48 359/485.01 |
| 2011/0256322 A1 | 10/2011 | Outlaw et al. | |
| 2012/0301629 A1 | 11/2012 | Kim et al. | |
| 2015/0099828 A1 | 4/2015 | Akimoto et al. | |
| 2016/0032137 A1* | 2/2016 | Kang ........................ | C08K 3/36 524/590 |

FOREIGN PATENT DOCUMENTS

| | | |
|---|---|---|
| CN | 1454243 A | 11/2003 |
| JP | 2000-112379 A | 4/2000 |
| JP | 2010-280832 A | 12/2010 |
| JP | 2011503658 A | 1/2011 |
| JP | 2012004487 A | 1/2012 |
| JP | 2013518713 A | 5/2013 |
| JP | 2014025061 A | 2/2014 |
| KR | 10-2006-0072476 A | 6/2006 |
| KR | 10-2007-0096329 A | 10/2007 |
| KR | 10-0916171 B1 | 9/2009 |
| KR | 10-2010-0009510 A | 1/2010 |
| KR | 10-2010-0026014 A | 3/2010 |
| KR | 10-2010-0041992 A | 4/2010 |
| KR | 10-0972625 B1 | 7/2010 |
| KR | 10-2011-0088010 A | 8/2011 |
| KR | 10-1058395 B1 | 8/2011 |
| KR | 10-2012-0044013 A | 5/2012 |
| WO | 02-010292 A1 | 2/2001 |
| WO | 2007/142142 A1 | 12/2007 |
| WO | 2013161866 A1 | 10/2013 |

OTHER PUBLICATIONS

International Search Report issued in International Application No. PCT/KR2014/002123 on Jun. 18, 2014, 3 pages.

* cited by examiner

*Primary Examiner* — Thao T Tran
(74) *Attorney, Agent, or Firm* — Rothwell, Figg, Ernst & Manbeck, P.C.

(57) ABSTRACT

Disclosed is a plastic film which exhibits high hardness and processability without the problems of curling, warping and cracking.

15 Claims, No Drawings

PLASTIC FILM

CROSS REFERENCE TO RELATED APPLICATIONS

This application is a 35 U.S.C. §371 National Phase Entry Application from PCT/KR2014/002123, filed Mar. 13, 2014, and designating the United States, which claims priority under 35 U.S.C. §119 to Korean Patent Application No. 10-2013-0028141 filed on Mar. 15, 2013, and to Korean Patent Application No. 10-2014-0029033 filed on Mar. 12, 2014, which are incorporated herein by reference in their entireties.

BACKGROUND OF THE INVENTION (a) Field of the Invention

The present invention relates to a plastic film. More particularly, the present invention relates to a plastic film exhibiting a high level of hardness and excellent processability.

This application claims the benefit of Korean Patent Application No. 10-2013-0028141, filed on Mar. 15, 2013, and Korean Patent Application No. 10-2014-0029033, filed on Mar. 12, 2014, which are both hereby incorporated by reference in their entireties into this application.

(b) Description of the Related Art

With the advance of mobile appliances such as smart phones, tablet PCs and the like, further lightness and thinness have recently been required of substrates for displays. Display windows or front panels of such mobile appliances are generally made of glass or reinforced glass both of which have excellent mechanical properties. However, glass suffers from the disadvantage of increasing the weight of mobile appliances and is easily broken by external impact.

As an alternative to glass, plastic resins have been studied. Their light weight and resistance to impact are consistent with the trend of pursuing lighter and thinner mobile appliances. Particularly, a film with high hardness and wear resistance is required. In this regard, the utilization of a structure in which the substrate is coated with a coating layer has been proposed.

First of all, increasing the thickness of the coating layer is considered a possible approach to improving the surface hardness thereof. In fact, the coating layer should be of a minimal thickness to ensure the surface hardness of the coating layer. As the coating layer increases in thickness, the surface hardness thereof may become higher. However, a thicker coating layer, although increasing the surface hardness, is more prone to setting shrinkage, which leads to wrinkling or curling with the concomitant production of cracks or exfoliations, and thus thick coating layers are difficult to employ in practice.

Recently, several methods have been proposed for conferring a high hardness to plastic films, without the problems of cracking and setting shrinkage-induced curling.

Korean Patent Application Publication No. 2010-0041992 discloses a plastic film composition, free of monomers, comprising a binder resin based on ultraviolet-curable polyurethane acrylate oligomers. However, this plastic film has a pencil hardness of about 3H, and thus the strength thereof is insufficient to be a substitute for glass panels for displays.

SUMMARY OF THE INVENTION

Accordingly, the present invention has been made keeping in mind the above problems occurring in the prior art, and is intended to provide a plastic film which exhibits high hardness and processability without the problems of curling, warping and cracking.

In accordance with an aspect thereof, the present invention provides a plastic film, comprising:
a support substrate; and
a coating layer which is formed on at least one side of the support substrate, the coating layer comprising a crosslinked copolymer of tri- to hexafunctional acrylate-based monomers, a thermosetting resin, and inorganic fine particles.

Exhibiting high hardness, impact resistance, scratch resistance, and high transparency, in addition to being highly unlikely to curl and crack thanks to excellent processability, the plastic film of the present invention can be used as a substitute for a cover plate made of glass or reinforced glass, and thus can be usefully applied to mobile appliances, display instruments, and front panels and display windows of various instruments.

DETAILED DESCRIPTION OF THE EMBODIMENTS

The plastic film of the present invention comprises a support substrate and a coating layer which is formed on at least one side of the support substrate, the coating layer comprising a crosslinked copolymer of tri- to hexafunctional acrylate-based monomers, a thermosetting resin, and inorganic fine particles.

As used herein, the words "first" and "second" are employed only to describe various elements, and are intended to discriminate one element from another.

All of the terms used in the specification are taken only to illustrate embodiments, and are not intended to limit the present invention. As used herein and in the appended claims, the singular forms "a", "an", and "the" include plural references unless the context clearly dictates otherwise. Unless the context clearly requires otherwise, throughout the description and the claims, the words "comprise," "comprising," and the like are to be construed in an inclusive sense as opposed to an exclusive or exhaustive sense, that is to say, in the sense of "including, but not limited to."

Additionally, the words "on" or "above," as used in the context of formation or construction of one element, mean pertaining to the direct formation or construction of one element on another element directly or the additional formation or construction of one element between layers or on a subject or substrate.

The following detailed descriptions of embodiments of the invention are not intended to be exhaustive or to limit the invention to the precise form disclosed below. While examples for the invention are described below for illustrative purposes, specific embodiments of various equivalent modifications are possible within the scope of the invention, as those skilled in the relevant art will recognize.

Below, a detailed description will be given of the plastic film according to the present invention.

In accordance with an aspect thereof, the present invention provides a plastic film, comprising: a support substrate and a coating layer which is formed on at least one side of the support substrate, the coating layer comprising a crosslinked copolymer of tri- to hexafunctional acrylate-based monomers, a thermosetting resin, and inorganic fine particles.

In the plastic film of the present invention, any typical plastic resin, whether capable of being stretched or not, may be used for the support substrate on which the coating layer is formed, without limitations imposed thereon, so long as it is transparent. According to an embodiment of the present invention, the support substrate may be a film made of, for example, a polyester such as polyethyleneterephtalate (PET); a polyethylene such as ethylene vinyl acetate (EVA); a cyclic olefin polymer (COP); a cyclic olefin copolymer (COC); polyacrylate (PAC); polycarbonate (PC); polyethylene (PE); polymethylmethacrylate (PMMA); polyetheretherketon (PEEK); polyethylenenaphthalate (PEN); polyetherimide (PEI); polyimide (PI); triacetylcellulose (TAC); MMA (methyl methacrylate); or a fluoro-polymer. The support substrate may be a single layer structure, and, if necessary, may be a multilayer structure including two or more layers composed of the same or different materials, but is not particularly limited.

According to an embodiment of the present invention, the substrate may be a multilayered substrate made of polyethyleneterephthalate (PET) or co-extruded polymethylmethacrylate (PMMA)/polycarbonate (PC).

Further, according to an embodiment of the present invention, the support substrate may include a copolymer of polymethylmethacrylate (PMMA) and polycarbonate (PC).

The support substrate may range in thickness from about 30 to about 1,200 μm, or from about 50 to about 800 μm, but is not limited thereto.

The plastic film of the present invention is structured to have a coating layer formed on at least one side of a support substrate.

According to an embodiment of the present invention, the thickness ratio between the support substrate and the coating layer may be about 1:0.5 to about 1:2, or about 1:0.5 to about 1:1.5. When the thickness ratio thereof is within the above range, a plastic film can be formed which exhibits high hardness without being prone to curling or cracking.

In the plastic film of the present invention, the coating layer comprises a crosslinked copolymer of tri- to hexafunctional acrylate-based monomers, a thermosetting resin, and inorganic fine particles.

The coating layer can be formed by applying a coating composition comprising a tri- to hexafunctional acrylate-based monomer, a thermosetting prepolymer composition, an inorganic fine particle, and a photoinitiator to the support substrate, followed by photocuring and thermosetting.

As used herein, the term "acrylate-based" is intended to encompass acrylates, methacrylates, and substituted acrylates or methacrylates.

Examples of the tri- to hexafunctional acrylate-based monomers include, but are not limited to, trimethylolpropane triacrylate (TMPTA), trimethylolpropane ethoxy triacrylate (TMPEOTA), glycerin-propoxylated triacrylate (GPTA), pentaerythritol tetraacrylate (PETA), and dipentaerythritol hexaacrylate (DPHA). These tri- to hexafunctional acrylate-based monomers may be used alone or in combination.

When irradiated with UV light, the tri- to hexafunctional acrylate-based monomers may be crosslinked with each other to form a photocrosslinked copolymer which confers a high hardness on the coating layer thereof.

According to one embodiment of the present invention, the tri- to hexafunctional acrylate-based monomer may be used in an amount of approximately 40 to approximately 80 parts by weight, or approximately 50 to approximately 80 parts by weight, based on 100 parts by weight of the coating layer. When used in such amounts, the tri- to hexafunctional acrylate-based monomer can endow the plastic film with desirable physical properties such as high hardness, impact resistance, etc.

In the coating composition, the tri- to hexafunctional acrylate-based monomers can be crosslink-polymerized by light in the presence of a photoinitiator.

Examples of the photoinitiator may include, but are not limited to, 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-1-propanone, methylbenzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, bis(2,4,6-trimethylbenzoyl)-phenylphophine oxide, and the like. Further, the photoinitiator may be commercially available, such as those sold under brand name, Irgacure 184, Irgacure 500, Irgacure 651, Irgacure 369, Irgacure 907, Darocur 1173, Darocur MBF, Irgacure 819, Darocur TPO, Irgacure 907, and Esacure KIP 100F. These photoinitiators may be used alone or in combination.

The coating layer of the present invention contains a thermosetting resin.

Herein, the "thermosetting resin" means a thermoset obtained by thermally polymerizing solid components contained in a thermosetting prepolymer composition comprising an oligomer or polymer which is able to undergo crosslinking polymerization in the presence of heat.

In one embodiment of the present invention, the thermosetting prepolymer composition may comprise a polyester-based polyurethane oligomer, a polyol, and a polyisocyanate. In more detail, the thermosetting prepolymer composition may contain a polyester-based polyurethane oligomer in an amount of 10 to 40 wt %, a polyol in an amount of 5 to 30 wt %, and a polyisocyanate in an amount of 50 to 80 wt %, based on the total weight of the solid components thereof.

In one embodiment of the present invention, the polyester-based polyurethane oligomer has a number average molecular weight of approximately 1,000 to approximately 100,000 g/mol, a viscosity of approximately 100 to approximately 3,000 cps when dissolved at a concentration of 15% in cyclohexane, and a Tg of −30 to 40° C. The polyester-based polyurethane with such physical properties may be directly synthesized or may be commercially purchased. Among the commercially available products are ESTANE® 5701 TPU, ESTANE® 5703 TPU, ESTANE® 5707 TPU, ESTANE® 5708 TPU, ESTANE® 5713 TPU, ESTANE® 5714 TPU, ESTANE® 5715 TPU, ESTANE® 5719 TPU, and ESTANE® 5778 TPU, all from Noveon.

In one embodiment of the present invention, the polyol may range in number average molecular weight from approximately 1,000 to approximately 100,000 g/mol. In addition, the polyol may be selected from the group consisting of, but not limited to, polyethylene glycol polyol, polycarprolactone polyol, polyester polyol, polyether polyol, polyacryl polyol, polycarbonate polyoldiol, and a combination thereof. Preferred examples of the polyol include 1,4-butanediol, diethylene glycol, dipropylene glycol, polyalkylene glycol having an alkyl of 1 to 5 carbons, and polyalkylene ether polyol. The polyalkylene ether polyol may be selected from the group consisting of polytetramethylene ether glycol, poly(oxytetramethylene)ether glycol, poly(oxytetraethylene)ether glycol, poly(oxy-1,2-propylene)ether glycol, poly(oxy-1,2-butylene)ether glycol, and a combination thereof.

In one embodiment of the present invention, the polyisocyanate may have a number average molecular weight of approximately 500 to 50,000 g/mol. No particular limitations are imposed on the kind of the polyisocyanate. Preferred is a polymer polymerized from aliphatic and aromatic isocyanates. Examples of the aliphatic diisocyanate include 1,4-tetramethylene diisocyanate, 1,6-hexamethylene diisocyanate, 1,4-cyclohexyl diisocyanate, isophorone diisocyanate, and α,α-xylylene diisocyanate. Examples of the aromatic isocyanate include 4,4'-dimethylmethane diisocyante, 1,3-phenylene diisocyanate and toluene diisocyanate. In addition, a polyisocyanate polymerized from di- or trimers of the diisocyanates may be used.

The components contained in the thermosetting prepolymer composition are crosslink-polymerized with each other by heat to form a thermosetting resin which can confer high hardness and processability to the coating layer.

Generally, the tri- to hexafunctional acrylate-based monomer may cause a setting shrinkage or curl phenomenon in which a substrate is rolled up together with a coating layer due to shrinkage attributable to curing. The thermosetting prepolymer composition can counteract the setting shrinkage or curl phenomenon. The curl phenomenon is a phenomenon in which the edge or the like of a planar film is curvilinearly warped or rolled up when the planar film is spread on a flat plate, and this curl phenomenon occurs when an acrylate-based monomer is contracted in the procedure of photocuring this acrylate-based monomer by ultraviolet irradiation.

For use as a cover plate, a plastic film must be improved in surface hardness to a degree high enough to substitute for glass. Increasing the thickness of the coating layer is considered as an approach to improving the surface hardness thereof. In fact, the coating layer should be of a minimal thickness to ensure the surface hardness of the coating layer. As the coating layer increases in thickness, the surface hardness thereof may become higher. However, a thicker coating layer, although increasing the surface hardness, is more prone to setting shrinkage which leads to decreased adhesiveness and increased curling. In this regard, a planarization process may be separately employed. However, the coating layer is likely to crack during planarization. Accordingly, it is difficult to prepare a plastic film which is high enough in hardness to substitute for glass, without a decrease in desirable physical properties.

The presence of the thermosetting prepolymer composition in addition to the photocurable acrylate-based monomer allows the plastic film to maintain high hardness and to have improved processability by preventing photosetting-induced curling and increasing toughness. Hence, desirable physical properties of the plastic film can be reinforced by the thermosetting prepolymer composition.

In one embodiment of the present invention, the thermosetting prepolymer composition may further comprise a catalyst for promoting a thermosetting reaction. So long as it is known to promote the condensation of the thermosetting prepolymer composition, any catalyst may be available without limitations thereto. In detail, the catalyst may be at least one selected from the group consisting of dibutyltindilaurate (DBTDL), zinc octoate, iron acetyl acetonate, N,N-dimethyl ethanolamine, and triethylene diamine. These catalysts may be used alone or in combination with different kinds.

According to one embodiment of the present invention, the weight ratio of the crosslinked copolymer of tri- to hexafunctional acrylate-based monomers to the thermosetting resin may range from approximately 1:0.01 to approximately 1:3, or from approximately 1:0.1 to approximately 1:2, or from approximately 1:0.1 to approximately 1:1.5, or from approximately 1:0.1 to approximately 1:1.2. Given the amounts of the crosslinked copolymer of tri- to hexafunctional acrylate-based monomers and the thermosetting resin within the ranges set forth above, the hard coating film can be formed with good processability while retaining high hardness.

In one embodiment of the present invention, the thermosetting resin may be used in an amount of approximately 5 to approximately 50 parts by weight, or approximately 10 to approximately 40 parts by weight, based on 100 parts by weight of the coating layer. When used in such amounts, the thermosetting resin can endow the plastic film with good physical properties such as high hardness and high processability.

According to the plastic film of the present invention, the coating layer may include an interpenetrating polymer network (IPN) structure.

Herein, the 'IPN structure' means the co-existence of two or more crosslinked structures within the coating layer, as exemplified by first and second crosslinked structures constructed by the photocuring and the thermosetting, respectively. The plastic film of the present invention may have an IPN structure in which two or more crosslinked structures are entangled with each other within the coating layer.

In the present invention, the IPN structure may be constructed by subjecting a coating composition containing both an acrylate-based monomer having a photocurable functional group, and a thermosetting prepolymer composition to photocuring and thermosetting reactions. That is, photocuring and thermosetting are sequentially conducted on the coating composition and both the tri- to hexafunctional acrylate-based monomer and the thermosetting prepolymer composition to allow the photocured and thermoset moieties to be crosslinked to each other. Hence, the coating layer of the present invention contains an IPN structure comprising both a first crosslinked structure induced by photocuring the tri- to hexafunctional acrylate-based monomers and a second crosslinked structure induced by thermosetting the thermosetting prepolymer composition.

The coating layer of the present invention comprises inorganic fine particles which may be dispersed in the crosslinked copolymer of tri- to hexafunctional acrylate-based monomers or in the thermosetting resin or in both.

In one embodiment of the present invention, the inorganic fine particles may be nano-sized. For example, they may have a diameter of approximately 100 nm or less, or approximately 10 to approximately 100 nm, or approximately 10 to approximately 50 nm. As for the inorganic fine particles, silica fine particles, aluminum oxide particles, titanium oxide particles, or zinc oxide particles may be employed.

The inorganic fine particles can further reinforce the hardness of the plastic film.

According to one embodiment of the present invention, the inorganic fine particles may be used in an amount of approximately 5 to approximately 40 parts by weight, or approximately 10 to approximately 40 parts by weight, based on 100 parts by weight of the coating layer. When used in such amounts, the inorganic fine particles can bring about an improvement in the hardness of the plastic film.

The coating composition used for the coating layer may comprise an organic solvent.

In one embodiment of the present invention, the organic solvent may be selected from among alcohol solvents, such as methanol, ethanol, isopropyl alcohol, and butanol; alkoxy alcohol solvents, such as 2-methoxyethanol, 2-ethoxyethanol, and 1-methoxy-2-propanol; ketone solvents, such as acetone, methylethylketone, methylisobutyl ketone, methylpropyl ketone, and cyclohexanone; ethers, such as propylene glycol monopropylether, propyleneglycol monomethyl ether, ethylene glycol monethylether, ethyleneglycol monopropylether, ethyleneglycolmonobutylether, diethylenegly-colmonomethylether, diethylglycolmonoethyl ether, diethylglycolmonopropylether, diethylglycolmonobutylether, diethyleneglycol-2-ethylhexyl ether; aromatic solvents, such as benzene, toluene, and xylene; and a combination thereof.

According to one embodiment of the present invention, the content of the organic solvent may be variously adjusted to the degree that the physical properties of the coating composition of the present invention are not degraded. The organic solvent may be used in such an amount that the weight ratio of the solid component including the tri- to hexafunctional acrylate-based monomer, the thermosetting prepolymer composition, the photoinitiator, and the inorganic fine particles to the organic solvent ranges from approximately 70:30 to approximately 99:1. When used in this range, the organic solvent can exert proper fluidity and coatability.

Meanwhile, the coating layer of the present invention may include a typical additive such as a surfactant, a yellowing inhibitor, a leveling agent, an antifouling agent and the like, in addition to the crosslinked copolymer of tri- to hexafunctional acrylate-based monomers, the thermosetting resin, and the inorganic fine particles. Here, the content of the additive may be variously adjusted to the degree that the physical properties of the composition of the present invention are not degraded. Its content is not particularly limited, but preferably ranges from approximately 0.1 to 10 parts by weight, based on 100 parts by weight of the coating layer.

According to an embodiment of the present invention, the coating layer may include a surfactant as an additive. The surfactant may be a mono- or bi-functional fluorine-based acrylate, a fluorine-based surfactant, or a silicon-based surfactant. In this context, the surfactant may be contained in a dispersed or crosslinked form in the crosslinked copolymer.

Further, a yellowing inhibitor may be used as an additive. The yellowing inhibitor may be a benzophenone compound or a benzotriazole compound.

The coating composition comprising the aforementioned components is cured with heat and light to form a coating layer after it is applied to the support substrate.

In one embodiment of the present invention, the coating layer has a thickness of approximately 50 μm or higher, for example, approximately 50 to approximately 300 μm, approximately 50 to approximately 200 μm, approximately 50 to approximately 150 μm, or approximately 70 to approximately 150 μm.

Exhibiting excellent hardness, impact resistance, processability, scratch resistance, transparency, durability, light resistance, and transmittance, the plastic film of the present invention may find useful applications in various fields.

In one embodiment of the present invention, the coating layer may be formed on one side of the support substrate.

In another embodiment of the present invention, the coating layer may be formed on both sides of the support substrate.

When the coating layer is formed on both sides, the coating composition may be applied on the front and back sides of the support substrate in a sequential or simultaneous manner.

For this, after application of the coating composition to the support substrate, the solvent is evaporated and the coating composition is dried to planarize the coated surface at a predetermined temperature.

According to one embodiment of the present invention, a first coating composition is applied to one side of the support substrate, and photocured and thermoset, after which a second coating composition is subsequently applied to the other side of the support substrate, and then photocured and thermoset. In this context, the first and the second coating compositions are the same as the coating composition and are just terminologically discriminated for application to opposite respective sides of the substrate.

As for the order of photocuring and thermosetting processes, photocuring may be conducted prior to or subsequently to thermosetting. Preferably, the photocuring process is precedent to the thermosetting process to afford a plastic film with high hardness and higher processability.

There may be the problem of incomplete curing in a thick coating layer since UV light is less likely to penetrate deeply into a thicker coating layer. According to the present invention, the curing of the thermosetting prepolymer composition under heat can compensate for the insufficient photocuring which might occur, thereby reinforcing the hardness and physical properties of the coating layer. In addition, the IPN comprising the first crosslinked structure constructed by photocuring the tri- to hexafunctional acrylate-based monomers and the second crosslinked structure constructed by thermosetting the thermosetting prepolymer composition guarantees the film has both high hardness and processability.

The thermosetting is designed for the thermosetting prepolymer composition contained in the coating composition. It may be optionally carried out one or more times before or after UV irradiation or both for photocuring. The thermosetting may be achieved by heating at approximately 60 to approximately 140° C., at approximately 80 to approximately 130° C., or at approximately 80 to approximately 120° C. for approximately 1 min to approximately 1 hr, or for approximately 2 min to approximately 30 min.

In one embodiment of the present invention, when a plastic film piece with dimensions of 10 cm×10 cm, obtained by applying the coating composition to one side of the support substrate, and curing under light and heat, is placed on a flat plane, a maximal distance at which each edge of the piece is apart from the plane may be 3 cm or less, or 2.5 cm or less, or 2.0 cm or less.

In one embodiment of the present invention, when the plastic film is disposed on a plane after exposure to a temperature of 50° C. or higher at a humidity of 80% or higher for 70 hrs or longer, the maximum distance at which each edge or side of the plastic film is spaced apart from the plane may be approximately 1.0 mm or less, approximately 0.6 mm or less, or approximately 0.3 mm or less. More particularly, when the plastic film of the present invention is disposed on a plane after exposure to a temperature of 50° C. to 90° C. at a humidity of 80% to 90% for 70 to 100 hrs, each edge or side of the plastic film is spaced apart from the plane by approximately 1.0 mm or less, approximately 0.6 mm or less, or approximately 0.3 mm or less, maximally.

Exhibiting excellent physical properties including hardness, scratch resistance, impact resistance, transparency, durability, light resistance, and light transmittance, the plastic film of the present invention has useful applications in various fields.

For example, the plastic film of the present invention may have a pencil hardness of 6H or more, 7H or more, or 8H or more at a load of 1 kg. In addition, the plastic film of the present invention exhibits superiority in terms of impact resistance, so that it can be used as a substitute for glass panels. For example, the plastic film of the present invention may not crack even after a steel bead weighing 22 g is freely dropped from a height of 40 cm thereto.

Further, after the plastic film of the present invention is tested by double rubbing 400 times with a steel wool #0000 under a load of 500 g on a friction tester, only two or less scratches may appear.

The plastic film of the present invention may have a light transmittance of 92% or more, and a haze of 1.0% or less, 0.5% or less, or 0.4% or less.

Furthermore, the plastic film fabricated by the method of the present invention may have an initial color b* (b* defined by the CIE 1976 L*a*b* color space) of 1.0 or less. After the coating film is exposed to UV-B under an ultraviolet lamp for 72 hrs or more, it may have a color b* value which differs from the pre-exposed color b* value by 0.5 or less, or by 0.4 or less.

As described above, the plastic film of the present invention can be applied to various fields. For example, the plastic film of the present invention can be used in touch panels of mobile terminals, smart phones or tablet PCs, and cover or device panels of various displays.

A better understanding of the present invention may be obtained through the following examples which are set forth to illustrate, but are not to be construed as limiting the present invention.

EXAMPLES

Preparation Example 1: Preparation of Thermosetting Prepolymer Composition

To a jacket reactor were placed 50 g of methylethyl ketone and 50 g of cyclohexanone, and then 70 g of polyurethane Estane 5701® (Noveon, polyurethane containing Bronsted salt, number average molecular weight 40,000) was added to the reactor, followed by stirring for 2 hrs at 80° C.

Afterward, 14 g of polytetramethyleneetherglycol (Terathane 1000®, Mw=1000, Sigma Aldrich), 1.5 g of 1,4-butanediol, and 17 g of a polyester polyol resin (dispersed in n-butyl acetate, Desmophen 670BA®, Bayer) were added to the reactor, and stirred at room temperature for 30 min. Subsequently, 124 g of a cyclic polyisocyanate (blocked with MEKO, Vestant B 1358A®, Degusa), 0.3 g of dibutyltin dilaurate (DBTDL), and 1.2 g of Tego 410® and 1.2 g of Tego 450®, which are both fluidity improvers, were introduced into the reactor, followed by stirring of homogeneity to afford a thermosetting prepolymer composition with the solid fraction composed of the polyester-based polyurethane oligomer, the polyole and the polyisocyanate amounting to approximately 70%.

Example 1

A first coating composition was prepared by mixing 2.0 g of the thermosetting prepolymer composition of Preparation Example 1, 9 g of silica-dipentaerythritol hexaacrylate (DPHA) composite in which nano-silica with a diameter of 20~30 nm was dispersed by 40 weight % (silica 3.6 g, DPHA 5.4 g), 0.2 g of a photoinitiator (brand name: Darocur TPO), 0.1 g of a benzotriazole yellowing inhibitor (brand name: Tinuvin 400), and 0.05 g of a fluorine-based surfactant (brand name: FC4430). A second coating composition was also prepared in the same manner.

The first coating composition was applied to a PET support substrate 188 μm thick with a size of 15 cm×20 cm, followed by subjecting the composition to first photocuring by exposure to 280~350 nm UV light from a black light fluorescence lamp and then to thermosetting at 130° C. for 30 min to form a first coating layer.

Subsequently, the second coating composition was applied to the back side of the support substrate, and then exposed to 280~350 nm UV light from a black light fluorescence lamp and then to heat at 130° C. for 30 min to form a second coating layer. After completion of the curing, each of the coating layers formed on both sides of the substrate was 100 μm thick.

Example 2

A plastic film was prepared in the same manner as in Example 1, with the exception that the thermosetting prepolymer composition of Preparation Example 1 was used in an amount of 2.0 g, instead of 3.6 g.

Example 3

A plastic film was prepared in the same manner as in Example 1, with the exception that 9 g of the silica-trimethylolpropane triacrylate (TMPTA) composite in which nano-silica with a size of 20~30 nm was dispersed by 40 weight % (silica 3.6 g, TMPTA 5.4 g) was used, instead of 9 g of the silica-DPHA composite.

Example 4

A plastic film was prepared in the same manner as in Example 1, with the exception that the thermosetting prepolymer composition of Preparation Example 1 was used in an amount of 0.7 g, instead of 2.0 g.

Example 5

A plastic film was prepared in the same manner as in Example 1, with the exception that the thermosetting prepolymer composition of Preparation Example 1 was used in an amount of 9.0 g, instead of 2.0 g.

Comparative Example 1

A plastic film was fabricated in the same manner as in Example 1, with the exception that the silica-DPHA composite was used in an amount of 10 g (silica 4 g, DPHA 6 g), instead of 9 g, and that the thermosetting prepolymer composition of Preparation Example 1 was not used.

Comparative Example 2

A plastic film was fabricated in the same manner as in Example 1, with the exception that the thermosetting prepolymer composition of Preparation Example 1 was used in an amount of 25.0 g, instead of 2.0 g.

Main components of the compositions used in Examples 1 to 5 and Comparative Examples 1 and 2 are summarized in Table 1, below.

TABLE 1

| Ex. No | Kind and Content of Tri- to hexafunctional acrylate-based monomer (Unit: g) | Silica (Unit: g) | Thermosetting prepolymer composition (Unit: g) |
|---|---|---|---|
| Example 1 | DPHA, 5.4 | 3.6 | 2.0 (solid content 1.4 g) |

TABLE 1-continued

| Ex. No | Kind and Content of Tri- to hexafunctional acrylate-based monomer (Unit: g) | Silica (Unit: g) | Thermosetting prepolymer composition (Unit: g) |
|---|---|---|---|
| Example 2 | DPHA, 5.4 | 3.6 | 3.6 (solid content 2.5 g) |
| Example 3 | TMPTA, 5.4 | 3.6 | 2.0 (solid content 1.4 g) |
| Example 4 | DPHA, 5.4 | 3.6 | 0.7 (solid content 0.5 g) |
| Example 5 | DPHA, 5.4 | 3.6 | 9.0 (solid content 6.3 g) |

TABLE 1-continued

| Ex. No | Kind and Content of Tri- to hexafunctional acrylate-based monomer (Unit: g) | Silica (Unit: g) | Thermosetting prepolymer composition (Unit: g) |
|---|---|---|---|
| Comparative Example 1 | DPHA, 6 | 4 | — |
| Comparative Example 2 | DPHA, 5.4 | 3.6 | 25.0 (solid content 17.5 g) |

Test Examples

Measurement Methods

1) Pencil Hardness

Pencil hardness was evaluated according to the Japanese Standard JIS K5400. In this regard, the plastic film was doubly rubbed three times with a pencil hardness meter under a load of 1.0 kg to determine the hardness at which no scratches appeared.

2) Scratch Resistance

The plastic film was doubly rubbed 400 times with a steel wool (#0000) under a load of 0.5 kg in a friction tester, and scratches thus formed were counted. Evaluation was made of the scratch resistance of the films by marking O for two or less scratches, Δ for two to less than five scratches, and x for five or more scratches.

3) Light Resistance

Differences in color b* value of the plastic films were measured before and after exposure to UVB from UV lamp for 72 hrs.

4) Transmittance and Haze

The plastic film was measured for transmittance and haze using a spectrophotometer (brand name: COH-400))

5) Curl Property

After the formation of the first coating layer, the plastic film was cut into a piece with dimensions of 10 cm×10 cm and placed on a flat plane. A maximal distance at which each edge of the piece was apart from the plane was measured.

6) Cylindrical Bending Test

Each of the plastic films was wound on a cylindrical mandrel having a diameter of 3 cm. When the plastic film was not cracked, it was evaluated as OK. If the plastic film was cracked, it was evaluated as X.

7) Impact Resistance

The impact resistance of each of the plastic films was evaluated by determining whether or not each of the plastic films was cracked when a 22 g steel ball was freely dropped thereon from a height of 40 cm. Each of the plastic films was evaluated as OK when it was not cracked, and as X when cracked.

The results of the physical properties measured in each of the plastic films are summarized in Table 2, below.

TABLE 2

|  | EX. 1 | EX. 2 | EX. 3 | EX. 4 | EX. 5 | C. EX. 1 | C. EX. 2 |
|---|---|---|---|---|---|---|---|
| Pencil hardness | 9H | 8H | 8H | 9H | 6H | 9H | 4H |
| Scratch resistance | ○ | ○ | ○ | ○ | ○ | ○ | Δ |
| Light resistance | 0.20 | 0.24 | 0.15 | 0.38 | 0.38 | 0.35 | 0.30 |
| Transmittance | 92.3 | 92.1 | 92.4 | 92.0 | 91.8 | 92.3 | 92.0 |
| Haze | 0.2 | 0.3 | 0.2 | 0.2 | 0.4 | 0.3 | 0.4 |
| Bending test | OK | OK | OK | OK | OK | X | OK |
| Curl property | 2.5 cm | 1.5 cm | 2.0 cm | 3.0 cm | 0.5 cm | 4.5 cm | 0.1 cm |
| Impact resistance | OK | OK | OK | OK | OK | X | OK |

As shown in Table 2 above, all of the plastic films of Examples 1 to 5 were found to have good physical properties, particularly, to exhibit excellent processability in terms of curl and bending properties, in addition to high hardness.

What is claimed is:

1. A plastic film, comprising:
a support substrate; and
a coating layer which is formed on one side of the support substrate, the coating layer comprising a crosslinked copolymer of tri- to hexafunctional acrylate-based monomers, a thermosetting resin, and inorganic fine particles,
wherein the thermosetting resin is a thermoset of a prepolymer composition comprising a polyester-based polyurethane oligomer, a polyol, and a polyisocyanate;
the polyol is selected from the group consisting of polyethylene glycol polyol, polycaprolactone polyol, polyester polyol, polyether polyol, polyacryl polyol, polycarbonate polyol, and a combination thereof; and
wherein the plastic film exhibits a pencil hardness of 6H or more at a load of 1 kg.

2. The plastic film of claim 1, wherein the thermosetting prepolymer composition contains the polyester-based polyurethane oligomer in an amount of 10 to 40 wt %, the polyol in an amount of 5 to 30 wt %, and the polyisocyanate in an amount of 50 to 80 wt %, based on the total weight thereof.

3. The plastic film of claim 1, wherein the polyester-based polyurethane oligomer has a number average molecular weight of 1,000 to 100,000 g/mol.

4. The plastic film of claim 1, wherein the polyisocyanate is polymerized from at least one selected from the group 1,4-tetramethylene diisocyanate, 1,6-hexamethylene diisocyanate, 1,4-cyclohexyl diisocyanate, isophorone diisocyanate, α,α-xylylene diisocyanate, 4,4'-dimethylmethane diisocyanate, 1,3-phenylene diisocyanate and toluene diisocyanate, a dimer thereof, and a trimer thereof.

5. The plastic film of claim 1, wherein the crosslinked copolymer of tri- to hexafunctional acrylate-based monomers and the thermosetting resin are used at a weight ratio of from approximately 1:0.01 to 1:3.

6. The plastic film of claim 1, wherein the thermosetting prepolymer composition further comprises at least one catalyst selected from the group consisting of dibutyltindilaurate (DBTDL), zinc octoate, iron acetyl acetonate, N,N-dimethyl ethanolamine, and triethylene diamine.

7. The plastic film of claim 1, wherein the tri- to hexafunctional acrylate-based monomers include at least one selected from the group consisting of trimethylolpropane triacrylate (TMPTA), trimethylolpropane ethoxy triacrylate (TMPEOTA), glycerin propoxylated triacrylate (GPTA), pentaerythritol tetraacrylate (PETA), and dipentaerythritol hexaacrylate (DPHA).

8. The plastic film of claim 1, wherein the inorganic fine particles have a diameter of 100 nm or less.

9. The plastic film of claim 1, wherein the inorganic fine particles comprise at least one selected from the group consisting of silica nanoparticles, aluminum oxide fine particles, titanium oxide fine particles, and zinc oxide fine particles.

10. The plastic film of claim 1, wherein the coating layer comprises the crosslinked copolymer of tri- to hexafunctional acrylate-based monomers in an amount of 40 to 80 parts by weight, the thermosetting resin in an amount of 5 to 50 parts by weight, and the inorganic fine particles in an amount of 5 to 40 parts by weight, based on 100 parts by weight thereof.

11. The plastic film of claim 1, wherein the coating layer is formed on both sides of the support substrate.

12. The plastic film of claim 1, wherein the coating layer has an interpenetrating polymer network (IPN) structure.

13. The plastic film of claim 12, wherein the coating layer contains an IPN structure comprising both a first crosslinked structure induced by photocuring the tri- to hexafunctional acrylate-based monomers and a second crosslinked structure induced by thermosetting the thermosetting prepolymer composition.

14. The plastic film of claim 1, exhibiting no cracks after a steel bead weighing 22 g is freely dropped from a height of 40 cm thereto.

15. The plastic film of claim 1, allowing two or less scratches to be produced thereon when being tested by double rubbing 400 times with a steel wool #0000 under a load of 500 g.

* * * * *